(12) United States Patent
Sohum et al.

(10) Patent No.: US 11,151,605 B2
(45) Date of Patent: Oct. 19, 2021

(54) METHOD AND SYSTEM FOR CLICK TO INSTALL BEHAVIOR BASED DETECTION OF FRAUD

(71) Applicant: Affle (India) Limited, Mumbai (IN)

(72) Inventors: Anuj Khanna Sohum, Singapore (SG); Charles Yong Jien Foong, Singapore (SG); Anurag Singh, Gurgaon (IN)

(73) Assignee: Affle (India) Limited, Mumbai (IN)

( * ) Notice: Subject to any disclaimer, the term of this patent is extended or adjusted under 35 U.S.C. 154(b) by 269 days.

(21) Appl. No.: 16/399,684

(22) Filed: Apr. 30, 2019

(65) Prior Publication Data

US 2019/0333100 A1      Oct. 31, 2019

(30) Foreign Application Priority Data

Apr. 30, 2018   (IN) .............................. 201821016231

(51) Int. Cl.
| | |
|---|---|
| *G06Q 30/00* | (2012.01) |
| *G06Q 30/02* | (2012.01) |
| *G06N 20/00* | (2019.01) |
| *G06F 21/31* | (2013.01) |

(52) U.S. Cl.
CPC ....... *G06Q 30/0248* (2013.01); *G06F 21/316* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,852,427 B2* | 12/2017 | Caldera | G06Q 20/4016 |
| 2016/0112475 A1* | 4/2016 | Lawson | H04L 67/02 |
| | | | 709/204 |
| 2018/0316722 A1* | 11/2018 | Jenson | G06N 5/022 |

* cited by examiner

*Primary Examiner* — Scott C Anderson
(74) *Attorney, Agent, or Firm* — Kolisch Hartwell, P.C.

(57) ABSTRACT

The present disclosure provides a method and system to detect advertisement fraud. The fraud detection platform receives device data and application data associated with one or more advertisements published on at least one publisher on one or more media devices. In addition, the fraud detection platform identifies a plurality of parameters based on the device data and the application data. Further, the fraud detection platform generates a plurality of graphs based on the device data, the application data, user behavior and the plurality of parameters. Furthermore, the fraud detection platform analyzes the plurality of graphs with trained data to identify fraud based on the deviation.

19 Claims, 4 Drawing Sheets

METHOD AND SYSTEM FOR CLICK TO INSTALL BEHAVIOR BASED DETECTION OF FRAUD

TECHNICAL FIELD

The present disclosure relates to the field of fraud detection systems, and in particular, relates to a method and system for click to install behavior based detection of fraud.

INTRODUCTION

With the advancements in technology over the last few years, users have predominantly shifted towards smartphones for accessing multimedia content. Nowadays, users access content through a number of mobile applications available for download through various online application stores. Businesses (Advertisers) have started focusing on generating revenue by targeting consumers through these mobile applications. In addition, businesses have started investing heavily on doing business through these mobile applications. Moreover, businesses (publishers and/or advertising networks) have started developing advertisement capable applications for serving advertisements through these mobile applications. These advertisements are published in real time or fixed placements through these mobile applications and watched by the users. The advertisers are benefited in terms of internet traffic generated on clicking, taking action like installing or on watching these advertisements. However, certain online publishers and advertising networks working with these publishers take undue advantage of this in order to generate high revenues. These online publishers and advertising networks employ fraudulent techniques in order to generate clicks, or increasing actions like increasing number of application installs for the advertisers through fraudulent means. In addition, these online publishers incentivize the users for clicking the links, downloading applications and the like. This results in a loss of advertisers marketing budget spent as many times these publishers claim a normal user-initiated action (Organic action, e.g. Organic Install) as one initiated by them or at times the clicks or application installs are not driven by humans at all and instead by bots. There is a consistent need to stop publishers from performing such types of click fraud and transaction fraud.

SUMMARY

In one aspect, the present disclosure provides a computer system. The computer system includes one or more processors and a memory. The memory is coupled to the one or more processors. The memory stores instructions. The instructions are executed by the one or more processors. The execution of instructions causes the one or more processors to perform a method to detect advertisement fraud based on time between events. The method includes a first step to receive device data and application data collected from a plurality of sources. In addition, the method includes a second step to identify a plurality of parameters based on the device data and the application data. Further, the method includes a third step to generate a plurality of graphs based on the device data, the application data, user behavior and the plurality of parameters. Furthermore, the method includes a fourth step to analyze the plurality of graphs with trained data. Moreover, the method includes a fifth step to score the publisher based on the deviation. Also, the method includes a sixth step to block the publisher if score of the publisher is above a predefined level. The device data and the publisher data are associated with one or more advertisements published on at least one publisher on one or more media devices. The plurality of parameters comprises of time taken between two events on the one or more media devices. The plurality of graphs is generated with respect to time when a signal generator circuitry embedded inside the one or more media devices generates a signal to trigger one or more hardware components. The one or more hardware components of the one or more media devices are triggered. The analysis is done based on the user behavior, the application data and the device data. The analysis is done to identify fraud based on the deviation. The analysis is done in real time. The scoring is done based on the analysis of the plurality of graphs. The blocking is done in real time.

BRIEF DESCRIPTION OF DRAWINGS

Having thus described the invention in general terms, references will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1A:
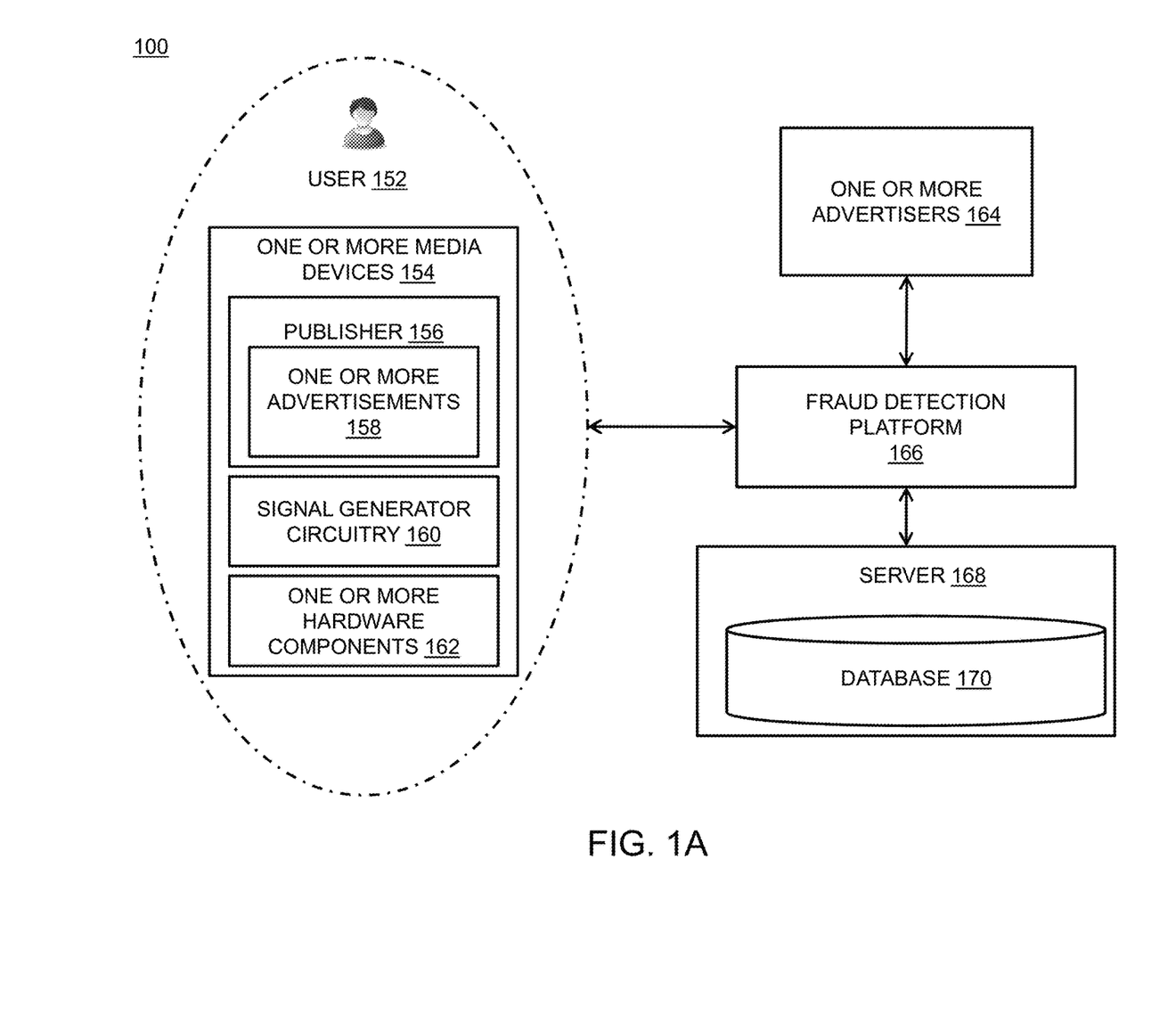
FIG. 1A illustrates an interactive computing environment for detection of advertisement fraud in real time, in accordance with various embodiments of the present disclosure.

FIG. 1A illustrates an interactive computing environment 100 for detection of an advertisement fraud in real time. The interactive computing environment 100 shows a relationship between various entities involved in detection of fraud in an advertisement based on time distribution analysis. The advertisement fraud is a type of fraud which is being done to generate more revenue from the advertisement being displayed by generating fake install or clicks. The fake install is done with the help of software, bots. The fake install or fake traffic is faked through techniques such as click fraud, transaction fraud and the like. The click fraud corresponds to regular or constant clicking by a user 152 or group of users on the advertisement in order to generate more revenue for a publisher 156. The click fraud is when the publisher 156 gets paid based on pay-per-click or pay-per-view bases whenever the advertisement gets clicked. The click fraud refers to the generation of fraudulent clicks through online bots which are not identifiable and are treated as genuine install. The transaction fraud refers to initiating install via fake clicks and bots (as described above in the application). The transaction fraud takes place when the publisher 156 applies fraudulent techniques to drive fake installs of applications in order to generate more revenue.

The interactive computing environment 100 includes the user 152, one or more media devices 154, the publisher 156, one or more advertisements 158, a signal generator circuitry 160, one or more hardware components 162, one or more advertisers 164, a fraud detection platform 166, a server 168 and a database 170. Each of the components of the interactive computing environment 100 interacts with each other to enable detection of advertisement fraud in real time based on time distribution analysis.

The interactive computing environment includes the user 152 who is any person present at any location and accessing the multimedia content. The user 152 may be any legal person or natural person who access online multimedia content and need an IP based network for accessing the multimedia content. In addition, the user 152 is an individual or person who access online multimedia content on the respective one or more media devices 154. Further, the user may be a computer or bots who is programmed to view the advertisement and performs click and transaction in order to do fraud. In an embodiment of the present disclosure, the user 152 includes but may not be limited to a natural person, legal entity, individual, machine and robots for viewing advertisement. The user 152 is associated with the one or more media devices 154.

The interactive computing environment further includes the one or more media devices 154 which help to communicate information. The one or more media devices 154 includes but may not be limited to a Smartphone, a laptop, a desktop computer, a tablet and a personal digital assistant. In an embodiment of the present disclosure, the one or more media devices 154 include a smart television, a workstation, an electronic wearable device and the like. In an embodiment, the one or more media devices 154 include portable communication devices and fixed communication devices. In an embodiment of the present disclosure, the one or more media devices 154 are currently in the switched-on state.

The user 152 accesses the one or more media devices 154 in real time. The one or more media devices 154 are any type of devices having an active internet. The one or more media devices 154 are internet-enabled device for allowing the user 152 to access the publisher 156. In an embodiment of the present disclosure, the user 152 may be an owner of the one or more media devices 154. In another embodiment of the present disclosure, the user 152 may not be the owner of the one or more media devices 154. In addition, the one or more media devices 154 are used for viewing an application which is installed on the one or more media devices 154.

The interactive computing environment 100 further includes the publisher 156 which is used for viewing content on the one or more media devices 154. The publisher 156 includes but may not be limited to mobile application, web application and website. The publisher 156 is the mobile application which displays content to the user 152 on the one or more media devices 154. The content may include one or more publisher content, one or more video content and the like. The application or the publisher 156 accessed by the user 152 shows content related to interest of the users 152. In an example, the user 152 may be interested in watching online videos, reading blogs, play online games, accessing social networking sites and the like. The publisher 156 is the application developed by the application developer for viewing or accessing specific content. The publisher 156 or applications are advertisement supporting applications which are stored on the one or more media devices 154. The publishers 156 or mobile applications are of many type which includes gaming application, a utility application, a service based application and the like. The publishers 156 provide space, frame, area or a part of their application pages for advertising purposes which is referred to as advertisement slots. The publisher 156 consists of various advertisement slots which depend on the choice of the publisher 156. The publishers 156 advertise products, services or businesses to the users 152 for generating revenue. The publisher 156 displays the one or more advertisements 158 on the one or more devices 154 when the user 152 is accessing the publisher 156.

The one or more advertisements 158 are a graphical or pictorial representation of the information in order to promote a product, an event, service and the like. In general, the one or more advertisements 158 are a medium for promoting a product, service, or an event. The one or more advertisements 158 include text advertisement, video advertisement, graphic advertisement and the like. The one or more advertisements 158 are displayed in third party applications developed by application developers. The one or more advertisements 158 are presented to attract the user 152 based on his interest in order to generate revenue. The one or more advertisements 158 are presented to the user 152 on the publisher 156 based on interest of the user 152 which is shown for a specific period of time. The user 152 click on the one or more advertisements 158 and the user 152 is redirected to a website or application or application store associated with the clicked one or more advertisements 158. The one or more advertisements 158 are provided to the publisher 156 by the one or more advertisers 164 who want to advertise their product, service through the publisher 156. The publisher 156 gets paid if the user 152 visits the application or website through the one or more advertisements 158 of the one or more advertisers 164. The number of user 152 who visits the one or more advertisements 158 through the publisher 156 generates more revenue for the publisher 156.

The one or more advertisers 164 are those who want to advertise their product or service and the like to the user 152. The one or more advertisers 164 approach the publisher 156 and provide the one or more advertisements 158 to be displayed for the user 152 on the publisher 156. The one or more advertisers 164 pay the publisher 156 based on the number of user 152 being redirected or taking the product or services provided by the one or more advertisers 164.

The one or more advertisements 158 are placed on the advertisement slots in the publisher application on the one or more media devices 154 associated with the user 152. The one or more advertisers 164 purchase the advertisement slots from the publisher 156. The one or more advertisements 158 may be served based on a real-time bidding technique or a direct contract between the one or more advertisers 164 and the publisher 156. The one or more advertisers 164 may provide the one or more advertisements 158 to advertising networks and information associated with advertising campaigns. The advertisement networks enable display of the one or more advertisements 158 in real time on the publisher 156 on behalf of the one or more advertisers 164. The advertising networks are entities that connect the one or more advertisers 164 to websites and mobile applications that are willing to serve advertisements.

The interactive computing environment 100 further includes the signal generator circuitry 160 for generating signal and to trigger the one or hardware component 162 associated with the one or more media devices 154. The one or more hardware components 162 are triggered for one or more purposes. The one or more purposes includes but may not be limited to receiving data, connection establishment between the third party databases and fraud detection platform 166. The one or more purposes include but may not be limited to blocking the IP address, sending and receiving information, and the like. The one or more purposes include generating a signal based on the requirement of the fraud detection platform 166. The signal generator circuitry 160 triggers the one or more hardware components 162 to perform a specific task in the one or more media devices 154.

The one or more hardware components 162 are components which are embedded inside the one or more media devices 154. The one or more hardware components 162 include but may not be limited to camera, microphone, LED, light sensor, proximity sensor and accelerometer sensor. The one or more hardware components 162 include but may not be limited to gyroscope, compass and the like. The one or more hardware components 162 are triggered when the signal generator circuitry embedded inside the one or more media devices 154 generates a signal to trigger the one or more hardware components 162.

The interactive computing environment 100 further includes the fraud detection platform 166 which is associated with the publisher 156 and the one or more advertisers 164. The fraud detection platform 166 detects advertisement fraud being done by the publisher 156 in order to generated fake traffic for the one or more advertisements 158. The fraud detection platform 166 is linked with the publisher 156 which may be more than one in real time. The fraud detection platform 166 is a platform for detecting click fraud and transaction fraud done by the publisher 156. The fraud detection platform 166 performs the detection of fraud in the one or more advertisements 158 in real time. The fraud detection platform 166 performs the detection of fraud by performing sequence of tasks which includes but may not be limited to receiving device data, receiving application data. Further, the fraud detection platform 166 performs the tasks of identifying parameters, generating graphs, analyzing graphs, indentify fraud and the like.

Reference will now be made to the components mentioned in FIG. 1B in order to explain the embodiments of the fraud detection platform 166. FIG. 1A illustrates the various module of the interactive computing environment 100.

The fraud detection platform 166 receives device data and application data which are collected from a plurality of sources. The fraud detection platform 166 receives the device data and the application data which is associated with the one or more advertisements 158. The one or more advertisements 158 are published on at least one publisher 156 on one or more media devices 154. The device data includes network type, device type, service provider, location, time-stamp, operating system, model number, number of application installed, IP address and the like. In an embodiment of the present disclosure, the device data includes but may not be limited to number of application uninstalled, screen size, network speed.

The network type include but may not be limited to any network used for communication such as 2G, 3G, 4G, Wi-Fi, LAN, broadband and leased line. The device type include but may not be limited to device used in the computing environment 100 such as 2G enabled, 3G enabled, 4G handset, Android OS device, windows OS and blackberry phone. The location is used to identify the country in which users 152 is viewing the one or more advertisements 158 on the one or more media devices 154. The user location facilitates to provide the maximum bandwidth in the particular location. The service provider is provider of internet service to the user 152; the service provider may be Airtel, Bsnl, Vodafone, reliance and the like. The time-stamp is the time at which the user 152 is accessing the one or more advertisements 158. The operating system is the software which is used in the one or more media device for performing its functions windows, ios, Android OS, bada, blackberry OS, and the like. In an embodiment of the present disclosure, the operating system includes but may not be limited to BlackBerry OS, MeeGo OS, Palm OS, Symbian OS and webOS. The network speed is network bandwidth provided by the network provider for accessing the one or more advertisements 158 on the one or more media devices 154.

The application data includes but may not limited to application size, time to download, time to run, redirection time, click to install and click to run. Further, the application data includes user click time, device load time, time to run, time to install, network download time, application usage time and the like. In an embodiment of the present disclosure, the application data include but may not be limited to application idle time, IP address switching time, application opening time and time to server.

The redirection time is the time required by the application from the click to the launch of the mobile application in the application store which is displayed in the one or more advertisements 158. The redirection time is based on the network speed and the device type and the like. The user click time is the time required by the user 152 to click the one or more advertisements 158 displayed on the one or more media devices 154. The user click time is based on the network type, network speed, download speed and the like. Time to install is the time required by the user 152 to install mobile application which is displayed using the one or more advertisements 158 on the one or more media devices 154. The user 152 install the mobile application displayed in the one or more advertisements 158 from the application store. The time to install is based on the network type, device type, bandwidth, location and the like. Time to run is the time required to run the application based upon the type of device being used by the user. Time to server is time required to send an install event to the tracking server. Time to download is the time required to download the application from the app store or the third party servers based on the connection type and bandwidth statistical analysis.

The plurality of sources includes but may not be limited to historical database, network type database, anonymous database, click/install database and the like which are stored in the database 170. In an embodiment of the present disclosure, the plurality of sources includes but may not be limited to click database, a plurality of third party database, a plurality of sensors and actuator. The plurality of sensor includes but may not be limited to global positioning system (GPS), proximity sensor, gyroscope sensor, accelerometer and the like.

Figure 1B:
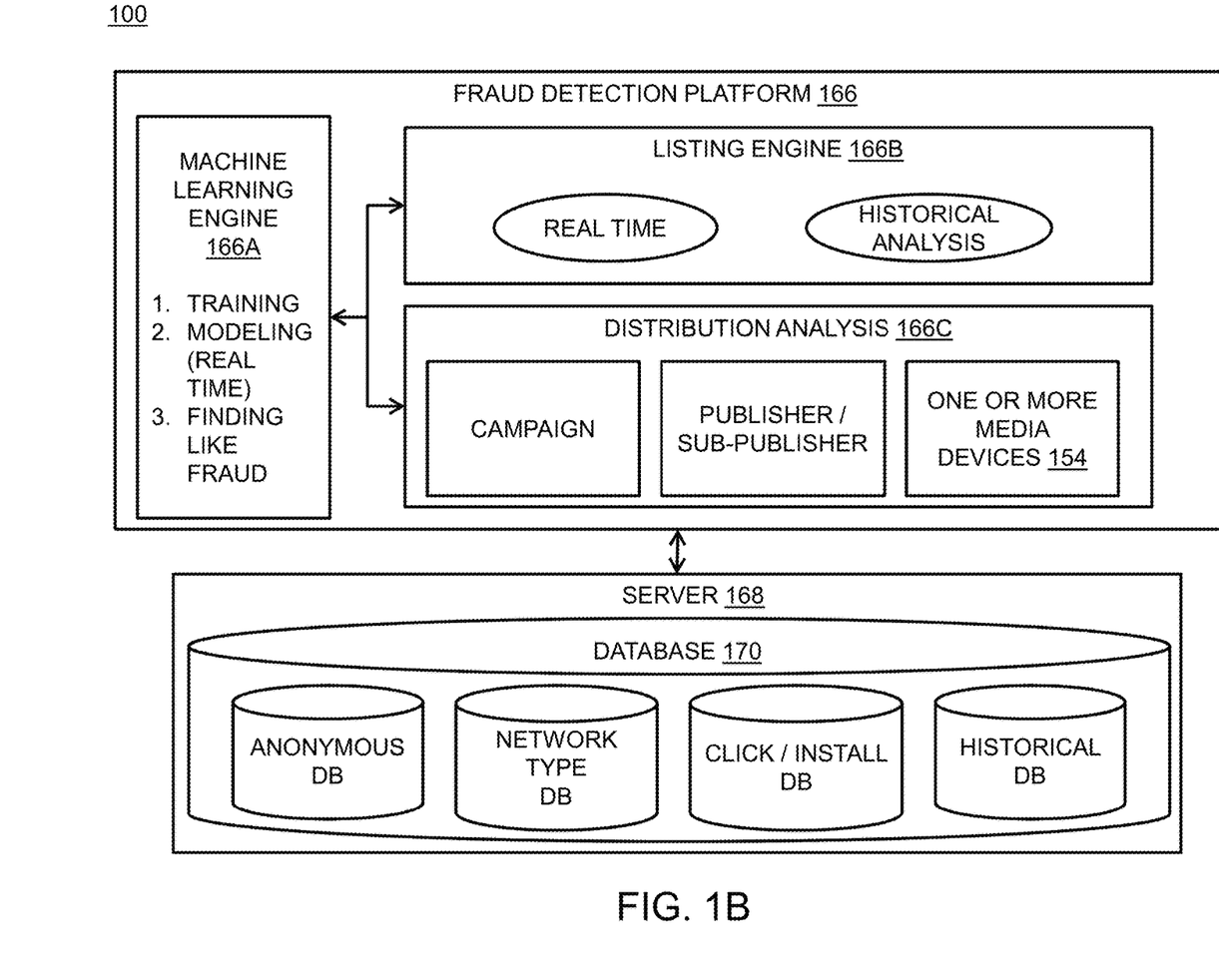
FIG. 1B illustrates a block diagram of various modules of the interactive computing environment, in accordance with various embodiments of the present disclosure.

The database 170 is as shown in FIG. 1B is where all the information is stored for accessing. The database 170 includes data which is pre-stored in the database and data collected in real-time. The database 170 may be a cloud database or any other database based on the requirement for the fraud detection. The data is stored in the database 170 in various tables. The tables are matrix which stored different type of data. In an example, one table may store data related to the user 152 and in other table the one or more media devices 154 related data is stored. The database 166 is area where all the information is stored for accessing.

In an embodiment of the present disclosure, the database 170 includes anonyms DB, network type DB, Historical DB, click/install DB and the like as shown in FIG. 1B. In another embodiment of the present disclosure, the database 170 includes but may not be limited to blocked publisher DB and safe publisher DB. The anonyms DB hold data related to public IP addresses, internet cafe IP addresses, shopping malls IP addresses, Airports IP addresses, hotel IP addresses, hosting providers and the like. The network type DB hold data related to type of network, the type of network includes home network, public network, tor networks and the like. The click/install DB hold data related to click time, run time, network time, install time and the like. The historical DB hold data related to past click time, run time, install time, location, time-stamp, the device data, the application data and the like. The historical DB is the data which is pre-defined or is already stored in the database 170. The database 170 is included inside the server 168 as shown in FIG. 1B.

The server 168 as shown in FIG. 1B is used to perform task of accepting request and respond to the request of other functions. The server 168 may be a cloud server which is used for cloud computing to enhance the real time processing of the system and using virtual space for task performance. In an embodiment of the present disclosure, the server 168 may be any other server based on the requirement for the fraud detection. The server 168 is used to perform task of accepting request and respond to the request of other functions.

In addition, the fraud detection platform 166 identifies a plurality of parameters based on the device data and the application data. The plurality of parameters comprises of time taken between two events on the one or more media devices 154. The plurality of parameters includes minimum redirection time, minimum click to install, minimum click to run, minimum user click time and the like. In an embodiment of the present disclosure, the plurality of parameters includes but may not be limited to minimum time to download, minimum device load time and minimum time to run. In another embodiment of the present disclosure, the plurality of parameters includes minimum time to install, minimum network download time and country bandwidth.

In an example, if the user perform purchase than he add the item to cart, checkout, validate payment and a confirmation will be send which will require certain time to run. If the time to run shows that the user has completed payment in less than the usual time to run than the fraud may be detected.

The identification is performed by the listing engine 166b of the fraud detection platform 166 which is shown in FIG. 1B. The listing engine 166b performs historical analysis and real time analysis of the device data and the application data in order to identify the plurality of parameters. In an embodiment of the present disclosure, the listing engine 166b uses data collected from a plurality of third party databases. The listing engine 168b performs historical analysis and real time analysis of the device data and application data in order to identify the plurality of parameters.

Further, the fraud detection platform 166 identifies the user behavior based on the application data, the past data and the third party database. The fraud detection platform 166 collects the data from the third party databases and the past data of the user 152 and the publisher 156. The user behavior includes user routine, time stamp, user interactions, application usage data, user usage time and the like. In an embodiment of the present disclosure, user behavior includes the user 152 usage pattern based on the data collected from the plurality of third party databases. The user behavior is based on the local time of the location of the user 152.

Furthermore, the fraud detection platform 166 examines the user behaviour based on the real-time and past data of the user 152 and the publisher 156. The examination is done based on the user behavior data collected from the plurality of third party databases, the device data and the application data. The examination is done to identify abnormal user behaviour in real time. The examination is done by the machine learning engine 166a. The machine learning engine 166a as shown in FIG. 1B receives the user behavior data, the application data, the past data and the device data. Further, the machine learning engine 166a collected data from the third party databases and receives real-time data of the one or more media devices 154.

The machine learning engine 166a performs training on the data in order to receive trained data. The machine learning engine 166a performs training based on the past data and real-time data. The training is performed using the machine learning and the data is trained by using the past data and real-time data. The training is done based on time taken between two events on the one or more media devices 154. In an embodiment of the present disclosure, the machine learning engine 166a performs training based on the application data, the device data and the user behavior. In addition, the machine learning engine 166a also performs modeling of the data in real-time. In an embodiment of the present disclosure, the machine learning engine 166a modeling in order to represent data in the database 170.

Moreover, the fraud detection platform 166 generates a plurality of graphs based on the device data, the application data and the plurality of parameters. The plurality of graphs is generated with respect to time when a signal generator circuitry 160 embedded inside the one or more media devices 154 generates a signal to trigger the one or more hardware components 162 of the one or more media devices 154. In an embodiment of the present disclosure, the signal generator circuitry 160 embedded inside the one or more media devices 154 trigger the GPS to identify location of the one or more media devices 154 at an instance.

The plurality of graphs comprises interaction graph and network graph. In an embodiment of the present disclosure, the plurality of graphs includes but is not limited to anonyms IP graph. In an embodiment of the present disclosure, the plurality of graphs may be any other graph based on the data collected from the plurality of third party databases, the device data, and the application data. The plurality of graphs is plotted by the fraud detection platform 166 with respect to time. The interaction graph is plotted between time and the user interaction of the user 152. The fraud detection platform generates at least one interaction graph based on the on the device data, the application data, user behavior and the plurality of parameters. The anonyms IP graph is plotted between time and the IP addresses data collected from the user 152. The network graph is plotted between time and the network information collected from the one or more media devices 154. The network graph contains information regarding the network speed and time.

Moreover, the fraud detection platform 166 analyzes the plurality of graphs with the trained data based on the user behavior, the application data and the device. The analysis is done to identify deviation from the trained data. The deviation may be determined by numerous statistical analyses including least mean square, or polynomial matching and the like. The analysis is done in real time by the machine learning engine 166*a* and the distribution analysis 166*c*.

The distribution analysis 166*c* as shown in FIG. 1B perform analysis of the data based on the publisher 156, one or more media devices 154 and the campaign being run by the publisher 156. The distribution analysis 168*c* collects data stored in the database 170 and the data related to the publisher 156, the device data and the campaign being run by the one or more advertisers 164. The distribution analysis 166*c* performs the analysis of the plurality of graphs in real-time to identify the fraud being committed by the publisher 156 by analyzing the deviation from the trained data.

Also, the fraud detection platform 166 scores the publisher 156 based on the deviation from the trained data. The scoring of the publisher 156 is done based on analysis of the plurality of graphs with the trained data. The deviation shows the change in the user behavior which identify if the user 152 is a genuine user or bots which is used by the publisher 156 for committing fraud. The scoring of the publisher based on the deviation of the plurality of the graphs by the fraud detection platform 166 helps to identify fraud.

Also, the fraud detection platform 166 blocks the publisher 156 based on the scores of the publisher 156. The blocking is performed by the fraud detection platform 166 by comparing the score of the publisher 156 with predefined level. The predefined level is the level which is defined by the one or more advertisers 164. In an embodiment of the present disclosure, the predefined level is defined by the advertising network. The fraud detection platform 166 blocks the publisher 156 from publishing the one or more advertisements 158 on the one or more media devices 154 if the score of the publisher 156 is above the predefined level.

In an embodiment of the present disclosure, the fraud detection platform 166 analyzes the already past data and the real-time data in order to identify abnormality in the data. The fraud detection platform 162 will mark the abnormality for analyzing it in the future in order to identify future fraud.

In another embodiment of the present disclosure, the fraud detection platform 166 build profile for each user 152 based on the application data, device data, and size of application that the user 152 usually downloads and has downloaded in the past. In yet another embodiment of the present disclosure, the fraud detection platform 162 may analyze past data, data collected from the third party databases where the user 152 has uninstalled the mobile application after downloading it. The fraud detection platform 166 may analyze the time difference of uninstalling and reinstalling the mobile application to determine download by fraudulent means and the user 152 was not interested in using the application.

In an example, if a user X is visiting a publisher Y and an advertisement Z is displayed on the publisher Y. The fraud detection platform 166 collects information about the location, device type, network type. The fraud detection platform 166 determines redirection time, user click time, click to install, time to run, time to server, and the like. Further, the fraud detection platform 166 identify the minimum click to install, minimum redirection time, minimum user click time, minimum time to run, minimum time to server time for the mobile application Y.

In another example, if a user X is visiting a publisher Y and an advertisement Z is displayed on the publisher Y. The fraud detection platform 166 collects information about the location, device type, network type, network speed. The fraud detection platform 166 determines redirection time, time to click, time to install, time to run, time to server, and the like. Further, the fraud detection platform 166 analyzes time to install the mobile application as a 50 MB application will require 3-second download based on location, network type, and device type. If a user X is downloading the 50 MB application in 1 second than fraud detection platform 166 will be able to identify the fraud. The fraud detection platform 166 will generate network graph and analysis will identify fraud as the deviation is high than the predefined level.

In an embodiment of the present disclosure, the one or more media devices 154 may include a monitoring application/service installed inside the one or more media devices 154. The monitoring application/service is associated with the fraud detection platform 166. In an embodiment of the present disclosure, the monitoring application/service enables the fraud detection platform 166 to perform correlation of real user interaction with reported interaction during install. The monitoring application/service enables the fraud detection platform 166 to intercept any touch/gesture events globally and checks whether the touch/gesture events match with publisher reported install/clicks. The monitoring application/service is packaged as an anti-malware/anti-virus solution and has other features as well.

Figure 2:
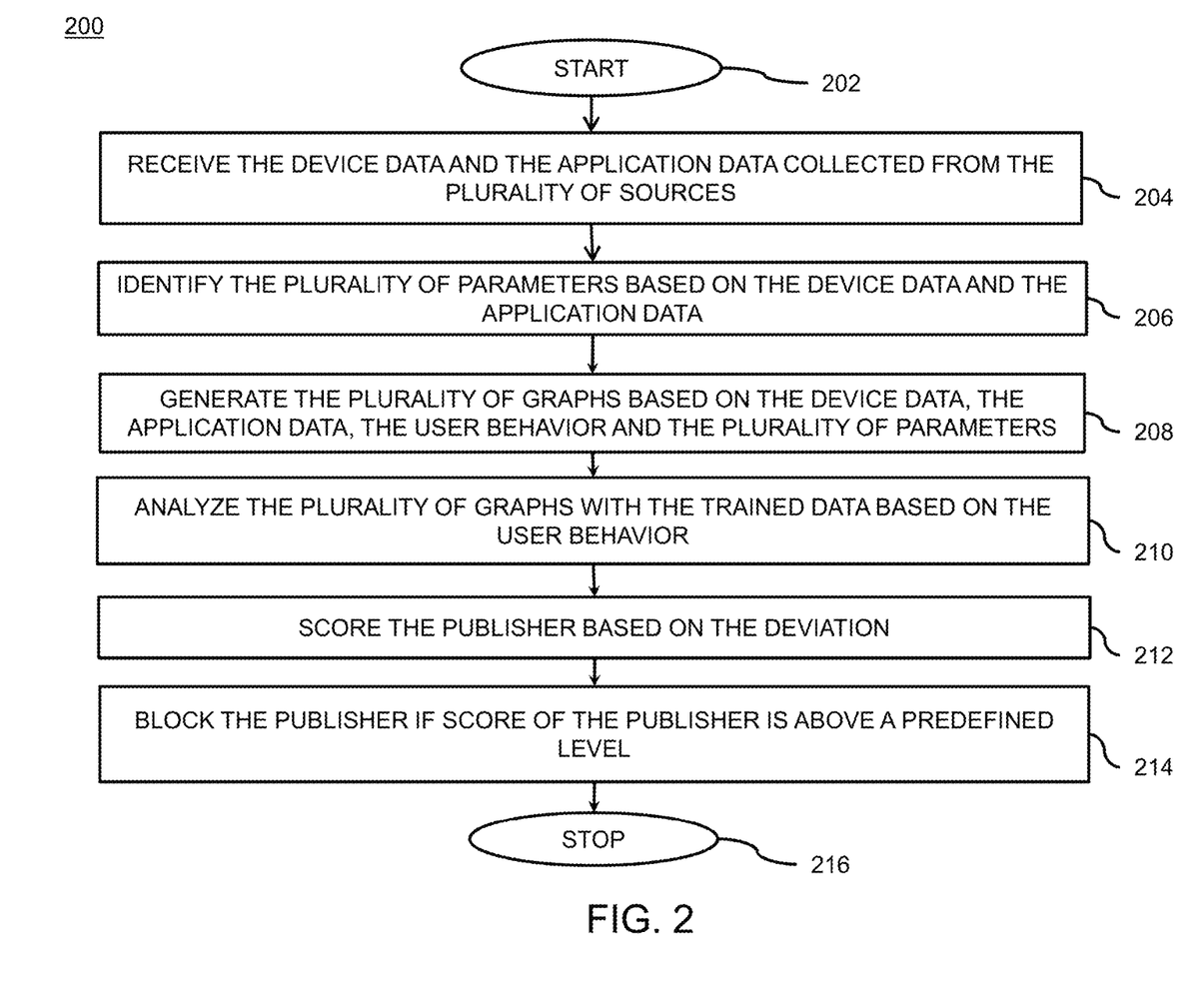
FIG. 2 illustrates a flow chart of a method for detection of advertisement fraud in real time, in accordance with various embodiments of the present disclosure.

FIG. 2 illustrates a flow chart 200 for click to install behavior based detection of fraud, in accordance with various embodiments of the present disclosure. It may be noted that to explain the process steps of flowchart 200, references will be made to the system elements of FIG. 1A and FIG. 1B. It may also be noted that the flowchart 200 may have fewer or more number of steps.

The flowchart 200 initiates at step 202. Following step 202, at step 204, the fraud detection platform 166 receives the device data and the application data collected from the plurality of sources. At step 206, the fraud detection platform 166 identifies the plurality of parameters based on the device data and the application data. At step 208, the fraud detection platform 166 generates the plurality of graphs based on the device data, the application data, the user behavior and the plurality of parameters. At step 210, the fraud detection platform 166 analyzes the plurality of graphs with the trained data based on the user behavior. At step 212, the fraud detection platform 166 scores the publisher 156 based on the deviation. At step 214, the fraud detection platform 166 blocks the publisher 156 if score of the publisher 156 is above a predefined level. The flow chart 200 terminates at step 216.

Figure 3:
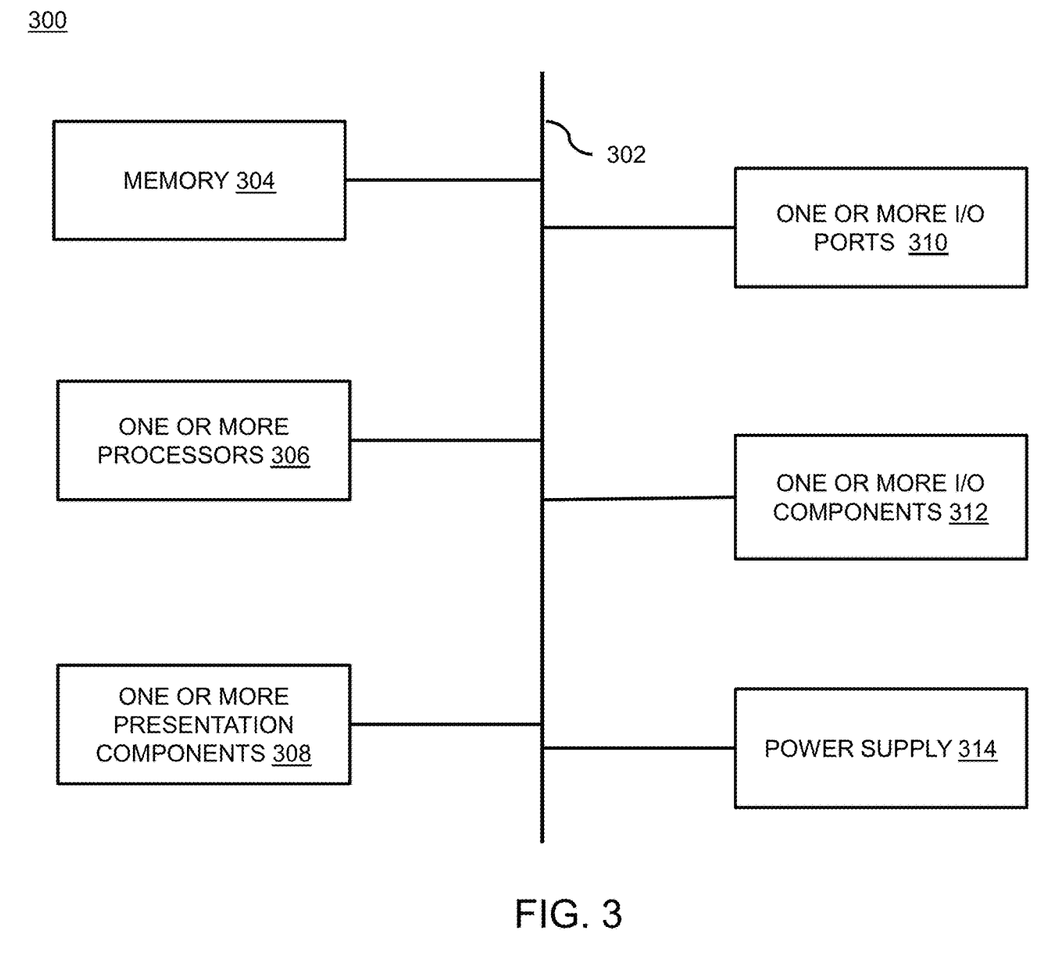
FIG. 3 illustrates a block diagram of a computing device, in accordance with various embodiments of the present disclosure.

FIG. 3 illustrates a block diagram of a device 300, in accordance with various embodiments of the present disclosure. The device 300 is a non-transitory computer readable storage medium. The device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the device 300 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The device 300 includes the one or more processors 306 that read data from various entities such as memory 304 or I/O components 312. The one or more presentation components 308 present data indications to the user or other device. Exemplary presentation components include a display device, speaker, printing component, vibrating component, etc. The one or more I/O ports 310 allow the device 300 to be logically coupled to other devices including the one or more I/O components 312, some of which may be built in. Illustrative components include a microphone, joystick, gamepad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:
1. A computer system comprising:
one or more processors; and
a memory coupled to the one or more processors, the memory storing instructions which, when executed by the one or more processors, cause the one or more processors to perform a method for click to install behavior based on detection of fraud, the method comprising:
  receiving, at a fraud detection platform, device data and application data collected from a plurality of sources, wherein the device data and the application data are associated with one or more advertisements published on at least one publisher on one or more media devices;
  identifying, at the fraud detection platform, a plurality of parameters based on the device data and the application data, wherein the plurality of parameters comprises time taken between two events on the one or more media devices;
  generating, at the fraud detection platform, a plurality of graphs based on the device data, the application data, user behavior and the plurality of parameters, wherein the plurality of graphs is generated with respect to time when a signal generator circuitry embedded inside the one or more media devices generates a signal to trigger one or more hardware components of the one or more media devices;
  analyzing, at the fraud detection platform, the plurality of graphs with trained data, wherein the analysis is done based on the user behavior, the application data and the device data, wherein the analysis is done to identify fraud based on deviation, wherein the analysis is done in real time;

scoring, at the fraud detection platform, the publisher based on the deviation, wherein the scoring is done based on the analysis of the plurality of graphs; and blocking, at the fraud detection platform, the publisher if the score of the publisher is above a predefined level, wherein the blocking is done in real time.

2. The computer system as recited in claim 1, wherein the device data comprises network type, service provider, location, time-stamp, operating system, model number, number of applications installed, number of applications uninstalled, screen size, network speed and device type.

3. The computer system as recited in claim 1, wherein the application data comprises application size, time to download, time to run, redirection time, click to install, click to run, user click time, device load time, time to run, time to install, network download time, application usage time, application idle time and application opening time.

4. The computer system as recited in claim 1, wherein the plurality of sources comprise an historical database, a network type database, an anonymous database, a click database, a plurality of third party databases, a plurality of sensors and an actuator.

5. The computer system as recited in claim 1, wherein the plurality of parameters comprises minimum redirection time, minimum click to install, minimum click to run, minimum user click time, minimum time to download, minimum device load time, minimum time to run, minimum time to install, minimum network download time and country bandwidth.

6. The computer system as recited in claim 1, wherein the plurality of graphs comprise an interaction graph, network graph and anonyms IP graph.

7. The computer system as recited in claim 1, further comprising, identifying, at the fraud detection platform, the user behavior from the application data, the past data and the third party database, wherein the user behavior comprises user routine, time stamp, user interactions and application usage data.

8. The computer system as recited in claim 1, further comprising examining, at the fraud detection platform, the user behavior based on the real-time and past data, wherein the examination is done to identify abnormal user behavior, wherein the examination is done in real time.

9. The computer system as recited in claim 1, further comprising training, at the fraud detection platform, the trained data using machine learning, wherein the data is trained by using the past data and real-time data, wherein the training is done based on time taken between two events on the one or more media devices.

10. A computer-implemented method for click to install behavior based on detection of fraud, the computer-implemented method comprising:

receiving, at a fraud detection platform with a processor, device data and application data collected from a plurality of sources, wherein the device data and the application data are associated with one or more advertisements published on at least one publisher on one or more media devices;

identifying, at the fraud detection platform with the processor, a plurality of parameters based on the device data and the application data, wherein the plurality of parameters comprises time taken between two events on the one or more media devices;

generating, at the fraud detection platform with the processor, a plurality of graphs based on the device data, the application data, user behavior and the plurality of parameters, wherein the plurality of graphs is generated with respect to time when a signal generator circuitry embedded inside the one or more media devices generates a signal to trigger one or more hardware components of the one or more media devices;

analyzing, at the fraud detection platform with the processor, the plurality of graphs with trained data, wherein the analysis is done based on the user behavior, the application data and the device data, wherein the analysis is done to identify fraud based on deviation, wherein the analysis is done in real time;

scoring, at the fraud detection platform with the processor, the publisher based on the deviation, wherein the scoring is done based on the analysis of the plurality of graphs; and blocking, at the fraud detection platform with the processor, the publisher if the score of the publisher is above a predefined level, wherein the blocking is done in real time.

11. The computer-implemented method as recited in claim 10, wherein the device data comprises network type, service provider, location, time-stamp, operating system, model number, number of applications installed, number of applications uninstalled, screen size, network speed and device type.

12. The computer-implemented method as recited in claim 10, wherein the application data comprises application size, time to download, time to run, redirection time, click to install, click to run, user click time, device load time, time to run, time to install, network download time, application usage time, application idle time and application opening time.

13. The computer-implemented method as recited in claim 10, wherein the plurality of sources comprise an historical database, a network type database, an anonymous database, click database, a plurality of third party databases, a plurality of sensors and an actuator.

14. The computer-implemented method as recited in claim 10, wherein the plurality of parameters comprises minimum redirection time, minimum click to install, minimum click to run, minimum user click time, minimum time to download, minimum device load time, minimum time to run, minimum time to install, minimum network download time and country bandwidth.

15. The computer-implemented method as recited in claim 10, wherein the plurality of graphs comprise an interaction graph, network graph and anonyms IP graph.

16. The computer-implemented method as recited in claim 10, further comprising, identifying, at the fraud detection platform with the processor, the user behavior from the application data, the past data and the third party database, wherein the user behavior comprises user routine, time stamp, user interactions and application usage data.

17. The computer-implemented method as recited in claim 10, further comprising examining, at the fraud detection platform with the processor, the user behavior based on the real-time and past data, wherein the examination is done to identify abnormal user behavior, wherein the examination is done in real time.

18. The computer-implemented method as recited in claim 10, further comprising
training, at the fraud detection platform with the processor, the trained data using machine learning, wherein the data is trained by using the past data and real-time data, wherein the training is done based on time taken between two events on the one or more media devices.

19. A non-transitory computer-readable storage medium encoding computer executable instructions that, when executed by at least one processor, perform a method for click to install behavior based on detection of fraud, the method comprising:
receiving, at a computing device, device data and application data collected from a plurality of sources, wherein the device data and the application data are associated with one or more advertisements published on at least one publisher on one or more media devices;
identifying, at the computing device, a plurality of parameters based on the device data and the application data, wherein the plurality of parameters comprises time taken between two events on the one or more media devices;
generating, at the computing device, a plurality of graphs based on the device data, the application data, user behavior and the plurality of parameters, wherein the plurality of graphs is generated with respect to time when a signal generator circuitry embedded inside the one or more media devices generates a signal to trigger one or more hardware components of the one or more media devices;
analyzing, at the computing device, the plurality of graphs with trained data, wherein the analysis is done based on the user behavior, the application data and the device data, wherein the analysis is done to identify fraud based on deviation, wherein the analysis is done in real time;
scoring, at the computing device, the publisher based on the deviation, wherein the scoring is done based on the analysis of the plurality of graphs; and
blocking, at the computing device, the publisher if the score of the publisher is above a predefined level, wherein the blocking is done in real time.

* * * * *